Jan. 26, 1965  E. J. JOFFE  3,166,795
APPARATUS FOR MANUFACTURING A FILM MOUNT
Filed Sept. 9, 1960
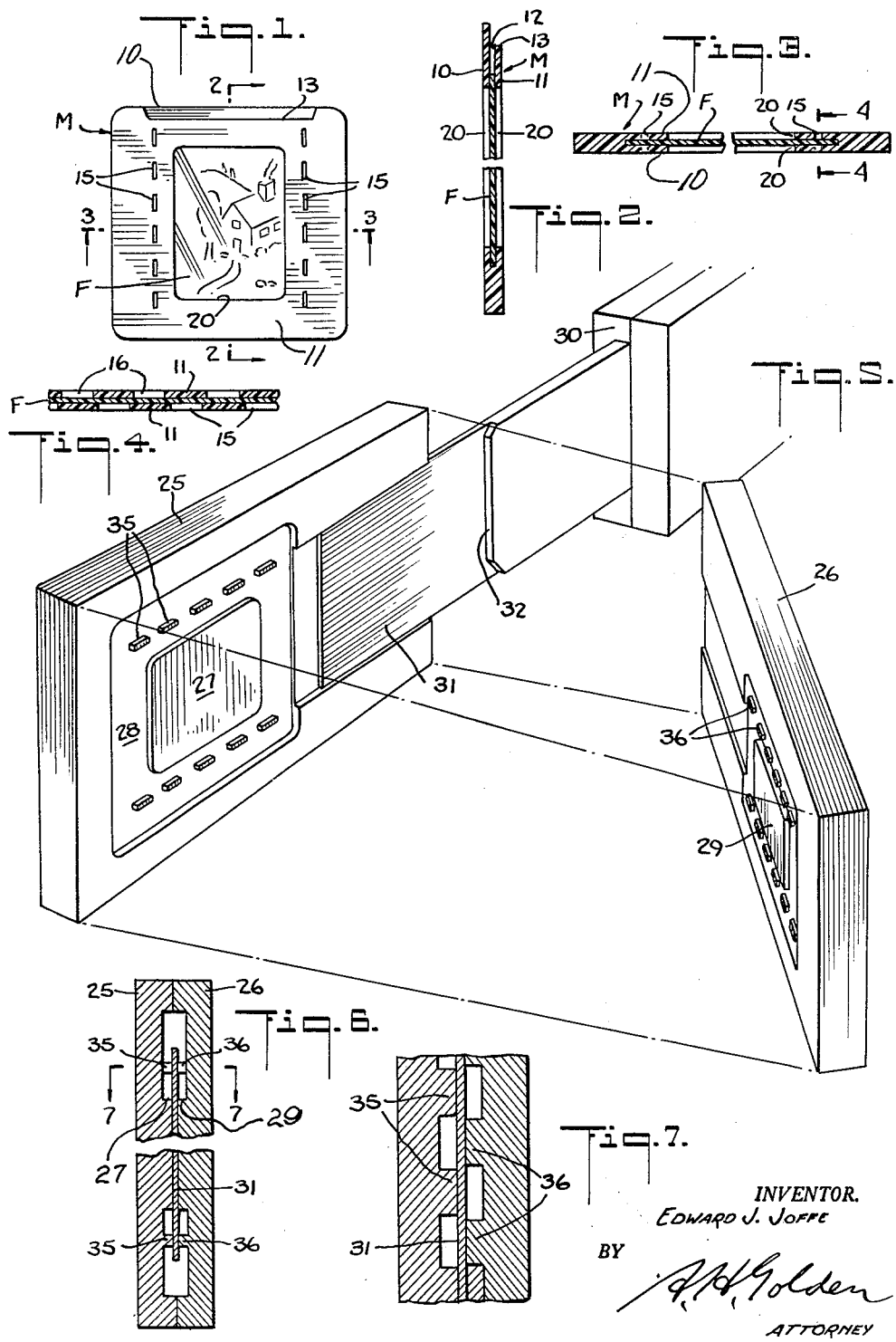
INVENTOR.
EDWARD J. JOFFE
BY
A. H. Golden
ATTORNEY United States Patent Office 3,166,795
Patented Jan. 26, 1965

3,166,795
APPARATUS FOR MANUFACTURING A
FILM MOUNT
Edward J. Joffe, Summit, N.J., assignor to Park Plastics Co., Inc., Linden, N.J., a corporation of New Jersey
Filed Sept. 9, 1960, Ser. No. 54,870
4 Claims. (Cl. 18—42)

This invention relates to an apparatus for forming a thin one-piece plastic film mount having a pocket for the insertion of a film.

The art has long sought an apparatus for producing a one-piece plastic film mount of the type to which I have referred, but so far as I know, no one has successfully solved the very difficult problems involved. A number of patents have issued to inventors covering plastic film mounts, but so far as I know, none of these have been commercially successful.

I have conceived an apparatus for manufacturing a one-piece plastic film mount. My method has proven to be extremely effective and highly desirable from a commercial and practical viewpoint.

In order to appreciate the problems involved in the making of a plastic film mount, it must be understood that the core for forming the pocket of the mount must have a thickness of .010 inch or less. All those skilled in the art will realize the tremendous problem involved in the forming of a pocket utilizing a core as thin as that required.

I have conceived an apparatus based on the utilization of a thin plate for forming the pocket of the mount, this thin plate being held in position by thin fingers of the die, these fingers in turn forming openings through which light would ordinarily pass when the mount is placed in a projector. By the staggering or offsetting of the fingers, solid material of the plastic casting is positioned to prevent the passage of light.

More particularly, I utilize a die formed of outer mating members between which the thin blade forming the pocket is placed. Thin fingers project from the mating members of the die and impinge against opposed surfaces of the edges of the blade to hold the blade edges firmly during the injection of the plastic molding material into the die opening. By staggering or offsetting the fingers impinging against one side of the blade relatively to the fingers impinging against the other side of the blade, the resulting openings in the plastic mount will be out of alignment and will prevent the passage of light.

Naturally, there are other features of the apparatus that are of importance, as for example, the placing of the outer mating parts of the die against the central portion of the blade to form the exposure opening of the film mount.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims be regarded as including such equivalent constructions as do not depart from the spirit and scope of my invention, in order to prevent the appropriation of my invention by those skilled in the art.

Referring now to the drawings:

FIG. 1 is an elevation of the film mount of my invention showing a film contained therein, the mount being ready now for placing in a projecting machine, FIG. 2 is a section taken along line 2—2 of FIG. 1, FIG. 3 is a section taken along line 3—3 of FIG. 2, FIG. 4 is a section taken along line 4—4 of FIG. 3, FIG. 5 is an exploded diagrammatic view of the parts of the die utilized in my method and forming the apparatus claimed herein, FIG. 6 is a vertical section of the die taken with the die closed and the blade projected into position for the casting operation, FIG. 7 is a section taken along line 7—7 of FIG. 6.

Referring now more particularly to the drawings, the one-piece plastic film mount of my invention is designated generally by reference letter M. The mount is formed with a back wall 10 and a forward wall 11, between which there is a vertical pocket 12 into which may enter a film F. The forward wall 11 has a scalloped upper end surface 13 to assist in the movement of a film downwardly into position within the pocket 12. The walls 10, 11 are naturally integral.

It will be noted that the forward wall 11 of the film mount M contains at each side a series of small openings 15, also well shown in FIG. 4. The wall 10 of the mount M also contains a series of like openings which are designated by reference numeral 16 in FIG. 4. It will be noted that the openings 15 in the wall 11 are offset relatively to the openings 16 in the wall 10. Therefore, when the film mount M is exposed to light, no light will pass through openings 15 and 16 because they are offset relatively to one another. As is common in film mounts, the walls 10 and 11 are each formed with an opening 20 through which light will pass, the light moving through the film F onto a screen, as is required in the art.

It will now be rather clearly apparent that the film mount of my invention is formed of a single piece of plastic having walls 10 and 11 defining therebetween a pocket 12 for the insertion of a film. It will be further apparent that the film will be exposed through openings 20 of the walls, and that these walls will have offset openings 15 and 16 formed during the casting operation of the film for the purpose to be indicated presently.

In the forming of my film I utilize preferably a pair of mating dies, one of which is designated by the reference numeral 25 and the other by reference numeral 26. Preferably, the dies are substantially the same, except with minor modifications. It will be understood, of course, that various desired die constructions may be utilized while still utilizing the basic concepts of my invention. For this reason, I do not show apertures or passages for the flow of plastic material into the die, since such apertures or passages are entirely conventional and may be formed as required by the size of the particular product. As shown in FIG. 5, the die 25 has a central portion 27 that is raised from the surface 28. Central portion 27 is obviously used to form the opening 20 in one of the walls 10, 11. The die 26 has also a central raised portion 29 for forming the opening 20 in the other wall of the film mount M.

The blade-carrying element of the die is designated by reference numeral 30, while the blade portion itself bears reference numeral 31. The blade has a raised portion 32 that is utilized for forming the scallop 13 in the wall 11 already described. In operation, the two parts of the die 25, 26 will be applied against the blade 31 with the raised central portions 27 and 29 impinging against the blade 31, as seen in FIG. 6, so that with the die closed the blade 31 and central portions 27 and 29 form for all practical purposes a single integral core. When plastic material is forced into the die opening (by means not shown because conventional), the blade 31 will form the pocket 12 with the blade part 32 forming the scallop 13. The plastic material will flow about the portions 31, 32, 27 and 29 to form the finished mount shown well in FIGS. 1, 2, 3 and 4.

For supporting the parts of thin blade 31 that extend beyond the central portions 27, 29, I utilize a series of fingers 35 on the die portion 25 and a similar series of fingers 36 on the die portion 26. When the dies 25, 26 close to bring the central portions 27, 29 against the blade 31, as shown in section in FIG. 6, the fingers 35 and 36 will impinge against opposed surfaces of the blade 31 near the edges of the blade. Obviously, the fingers will hold the blade edges firmly in position so as to contribute that accuracy in the forming of pocket 12 that is absolutely essential. This feature I consider of extreme importance.

Because the fingers 35, 36 extend from the die against the blade 31, it is obvious that the fingers will form openings leading from the outer walls 10 and 11 inwardly to the pocket 12. In FIG. 6 I show just how the fingers 35 and 36 impinge against blade 31, it being quite well understood that the open spaces shown in FIG. 6 will be filled with the plastic material for the purpose of forming the mount M. It will further be clear from FIG. 6 that the fingers 35, 36 will form openings leading to the pocket 12 because of the fact that the fingers impinge against the blade 31.

In FIG. 7, I illustrate a further important contribution of this portion of my invention, it being there seen that the fingers 35 are staggered or offset relatively to the fingers 36. Therefore, the openings 15 formed in wall 11 by the fingers 35, as well shown in FIG. 4, will be offset relatively to the openings 16 formed in the wall 10. Obviously, therefore, because of the offset relation of the openings 15, 16 no light will pass through the mount M. I am, therefore, able to form the pocket 12 accurately through utilization of the fingers 35, 36, while still eliminating any defect that might result through the utilization of those fingers.

The construction and merits of my invention should now be clear to those skilled in the art.

I now claim:

1. A die structure for forming a thin one piece plastic film mount having a pocket for the insertion of a film, comprising a thin movable blade, outer mating members for said die defining therebetween an opening in which the mount is cast, said blade moving into a medial position in said opening and forming the pocket in said mount when plastic material is injected into said die opening, medial portions of said dies impinging against opposed surfaces of said blade to form the display opening in said mount, thin fingers projecting from opposed surfaces of the mating members of said die spaced from said medial portions and impinging against opposed surfaces of edges of the blade to hold the thin blade edges firmly during the injection of plastic molding material into said die opening, the said fingers impinging against one surface of the blade being staggered relatively to those impinging against the other surface of the blade so that the resulting openings in the plastic mount will be out of alignment to prevent the passage of light.

2. A die structure for forming a thin one piece plastic film mount having a pocket for the insertion of a film, comprising a movable thin blade, outer members for said die defining therebetween an opening in which the mount is cast by the flow of plastic material into said opening, said blade moving into a medial position in said opening and forming the pocket in said mount when plastic material is injected into said die opening while said blade is in said die opening, and a series of thin fingers projecting from said outer members of the die to impinge against opposed surfaces of edges of the blade to hold the thin blade edges firmly within said opening during the injection of the plastic molding material into said die whereby said pocket is accurately formed.

3. A die structure for forming a thin one piece plastic film mount having a pocket for the insertion of a film, comprising a thin blade, outer members for said die defining an opening in which the mount is cast, said blade occupying a medial position in said opening and forming the pocket in said mount when plastic material is injected into said die, central portions of said outer members fitting against the central portion of said blade to form the viewing opening of said mount, thin fingers spaced from said central portions projecting from the outer members of the die and impinging against the opposed surfaces of edges of the blade to hold the thin blade edges firmly during the injection of plastic molding material into said die, those fingers impinging against the one surface of the blade being staggered relatively to those impinging against the other surface of the blade so that the resulting openings in the plastic mount will be out of alignment to prevent the passage of light.

4. A die structure for forming a thin one piece plastic film mount having a pocket for the insertion of a film, comprising a movable thin blade, outer members for said die defining therebetween an opening in which the mount is cast by the flow of plastic material into said opening, said blade moving into a medial position in said opening and forming the pocket in said mount when plastic material is injected into said die opening while said blade is in said die opening, medial portions of said die impinging against opposed surfaces of said blade to form the display opening in said mount, and a series of thin fingers projecting from said outer members of the die spaced from said medial portions to impinge against opposed surfaces of edges of the blade to hold the thin blade edges firmly within said opening during the injection of the plastic molding material into said die, whereby said pocket is accurately formed.

References Cited in the file of this patent

UNITED STATES PATENTS

| | | |
|---|---|---|
| 2,256,769 | Amrine | Sept. 23, 1941 |
| 2,364,870 | Otto | Dec. 12, 1944 |
| 2,390,053 | Bradford | Dec. 4, 1945 |
| 2,439,906 | Piron | Apr. 20, 1948 |
| 2,464,157 | Scheer et al. | Mar. 8, 1949 |
| 2,559,860 | Fay | July 10, 1951 |
| 2,566,636 | Renholts | Sept. 4, 1951 |
| 2,604,661 | Karns | July 29, 1952 |
| 2,705,344 | Solomone | Apr. 5, 1955 |
| 2,747,230 | Magnus | May 29, 1956 |
| 2,834,136 | Kiehl | May 13, 1958 |
| 2,880,462 | Lehman | Apr. 7, 1959 |